United States Patent
Tan et al.

(10) Patent No.: US 9,214,188 B1
(45) Date of Patent: Dec. 15, 2015

(54) ADJUSTING ROTATION SPEED OF DISK TO REDUCE FLY HEIGHT MODULATION WHEN SERVO WRITING IN GAS

(75) Inventors: Jern Khang Tan, Muar (MY); Amar Nath, Pathumthani (TH); Boworn Panyavoravaj, Bangkok (TH)

(73) Assignee: Western Digital Technologies, Inc., Irvine, CA (US)

(*) Notice: Subject to any disclaimer, the term of this patent is extended or adjusted under 35 U.S.C. 154(b) by 42 days.

(21) Appl. No.: 12/723,451

(22) Filed: Mar. 12, 2010

(51) Int. Cl.
*G11B 21/02* (2006.01)

(52) U.S. Cl.
CPC ..................................... *G11B 21/02* (2013.01)

(58) Field of Classification Search
None
See application file for complete search history.

(56) References Cited

U.S. PATENT DOCUMENTS

| | | | |
|---|---|---|---|
| 6,388,832 B1 | 5/2002 | Dobbek et al. | |
| 6,476,989 B1 | 11/2002 | Chainer et al. | |
| 6,671,232 B1 | 12/2003 | Stupp | |
| 6,912,103 B1 | 6/2005 | Peng et al. | |
| 6,914,742 B1 * | 7/2005 | Fioravanti et al. | 360/75 |
| 7,199,963 B2 | 4/2007 | Fukushima | |
| 7,268,966 B2 * | 9/2007 | Pit et al. | 360/75 |
| 7,839,595 B1 * | 11/2010 | Chue et al. | 360/75 |
| 2003/0172520 A1 | 9/2003 | Liu et al. | |
| 2006/0215309 A1 | 9/2006 | Gay Sam et al. | |
| 2006/0218416 A1 | 9/2006 | Gururangan et al. | |

OTHER PUBLICATIONS

Sung-Chang Lee, Andreas A. Polycarpou, "Effect of Hard-Disk Drive Spindle Motor Vibration on Dynamic Microwaviness and Flying-Height Modulation", Tribology International 38 (2005), pp. 665-674.

* cited by examiner

*Primary Examiner* — K. Wong

(57) ABSTRACT

A method is disclosed for selecting a rotation speed when servo writing a disk of a disk drive. A gas is injected into a head disk assembly (HDA) comprising the disk. The disk is rotated while reading data from the disk using a head to generate a read signal. A fly height modulation (FHM) of the head is measured in response to the read signal. When the FHM exceeds a threshold, the rotation speed is adjusted. The disk is servo written at the adjusted rotation speed. After servo writing the disk and evacuating the gas from the HDA, the disk is rotated at a normal rotation speed lower than the adjusted rotation speed used to servo write the disk, and manufacturing data is written to the disk at the normal rotation speed.

14 Claims, 5 Drawing Sheets

ADJUSTING ROTATION SPEED OF DISK TO REDUCE FLY HEIGHT MODULATION WHEN SERVO WRITING IN GAS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together to form a plurality of zones.

The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

The servo sectors $6_0$-$6_N$ may be written to the disk using any suitable technique, such as with an external servo writer or self-servo written by the disk drive. In one embodiment, seed tracks are written to the disk (e.g., spiral tracks are written using an external spiral writer or media writer) which are processed in order to write the servo sectors $6_0$-$6_N$ to the disk. When writing the servo sectors to the disk, an air bearing forms between the head and the disk due to the disk rotating at a high speed. The ability to maintain the head at a substantially constant fly height affects the quality of the written servo sectors and consequently the overall performance of the disk drive.

DETAILED DESCRIPTION OF EMBODIMENTS OF THE INVENTION

Figure 2A:
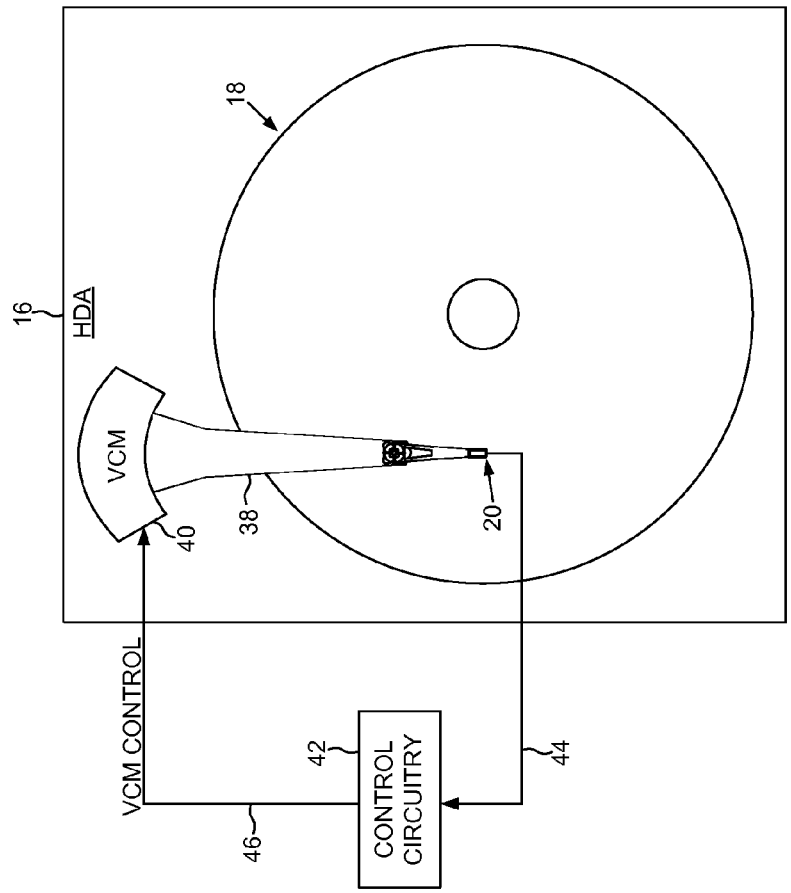
FIG. 2A shows a disk drive according to an embodiment of the present invention comprising a disk and a head inserted into a head disk assembly (HDA).
Figure 2B:
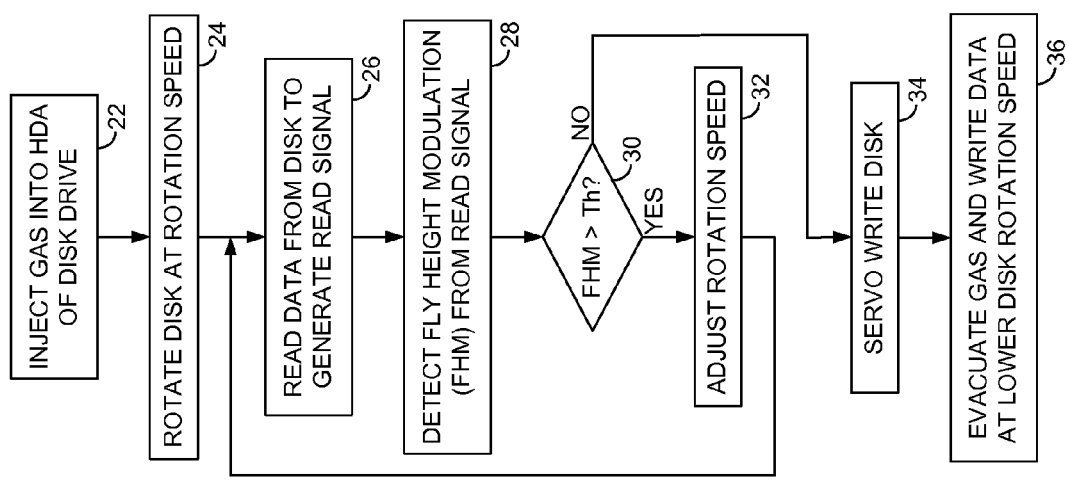
FIG. 2B is a flow diagram executed by control circuitry according to an embodiment of the present invention wherein after injecting a gas (e.g., helium) into the HDA the disk is servo written at a higher than normal rotation speed to reduce fly height modulation.

FIG. 2A shows a disk drive according to an embodiment of the present invention comprising a head disk assembly (HDA) 16 housing a disk 18 and a head 20 actuated over the disk 18. FIG. 2B is a flow diagram according to an embodiment of the present invention for selecting a rotation speed when servo writing the disk 18. A gas is injected into the HDA 16 (step 22). The disk 18 is rotated (step 24) while reading data from the disk using the head 20 to generate a read signal (step 26). A fly height modulation (FHM) of the head is measured in response to the read signal (step 28). When the FHM exceeds a threshold (step 30), the rotation speed is adjusted (step 32). The disk is servo written at the adjusted rotation speed (step 34). After servo writing the disk and evacuating the gas from the HDA 16, the disk is rotated at a normal rotation speed lower than the adjusted rotation speed used to servo write the disk, and manufacturing data is written to the disk at the normal rotation speed (step 36).

In the embodiment of FIG. 2A, the head 20 is coupled to a distal end of an actuator arm 38 that is rotated about a pivot by a voice coil motor (VCM) 40 in order to position the head 20 radially over the disk 18. Control circuitry 42 processes a read signal 44 emanating from the head 20 to detect the FHM and select the servo writing rotation speed for the disk. The control circuitry 42 may also generate a VCM control signal 46 applied to the VCM 40 for controlling the radial position of the head 20. In one embodiment, the VCM control signal 46 is generated in response to a position error signal (PES) generated in response to the read signal 44 (e.g., by reading servo data written on the disk 18). In one embodiment, the control circuitry 42 may be dedicated circuitry for measuring the FHM and adjusting the rotation speed of the disk 18. In this embodiment, a nominal rotation speed may be determined for servo writing a family of disk drives, wherein the nominal rotation speed is programmed into each production disk drive for self servo writing the disk 18. In an alternative embodiment, the control circuitry 42 for measuring the FHM and adjusting the rotation speed of the disk 18 may be the same circuitry employed in each production disk drive. In this embodiment, each production disk drive may determine the optimal rotation speed prior to self servo writing the disk 18.

Figure 3:
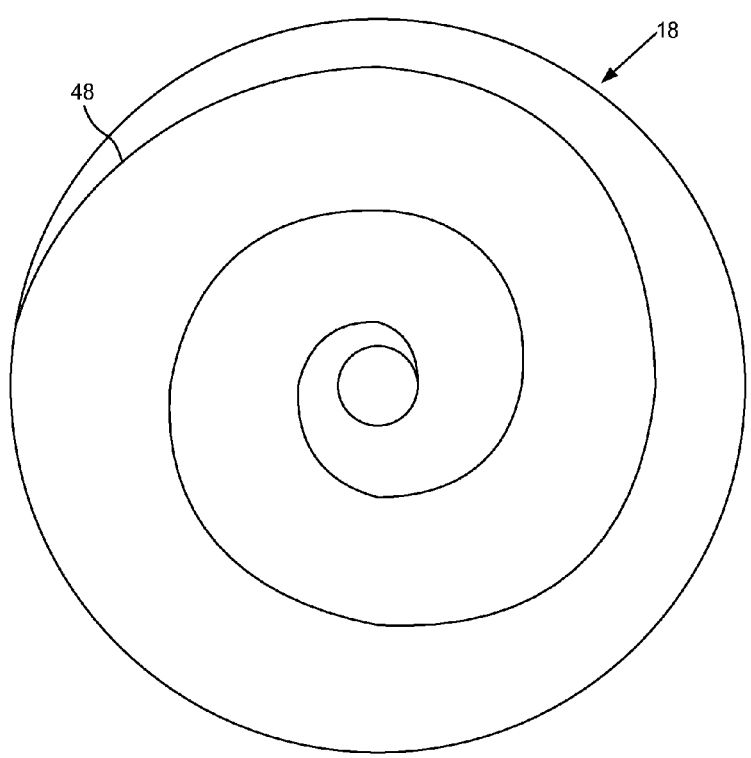
FIG. 3 shows an embodiment of the present invention wherein the disk is seeded with spiral tracks used for servo writing concentric servo sectors.

Any suitable data may be read from the disk 18 to measure the FHM in the embodiments of the present invention. FIG. 3 shows an embodiment wherein the data read from the disk 18 comprises a spiral track 48. The spiral track 48 may be written using a media writer prior to inserting the disk 18 into the HDA 16, or the spiral track 48 may be written by the control circuitry 42 after inserting the disk 18 into the HDA 16. In one embodiment, the spiral track 48 is written as a sequence of high frequency transitions with periodic sync marks while moving the head radially across the disk as is well known in the art. FIG. 3 shows a single spiral track 48 written to the disk, but other embodiments may employ multiple spiral tracks spaced circumferentially around the disk 18 (e.g., evenly spaced).

Figure 4A:
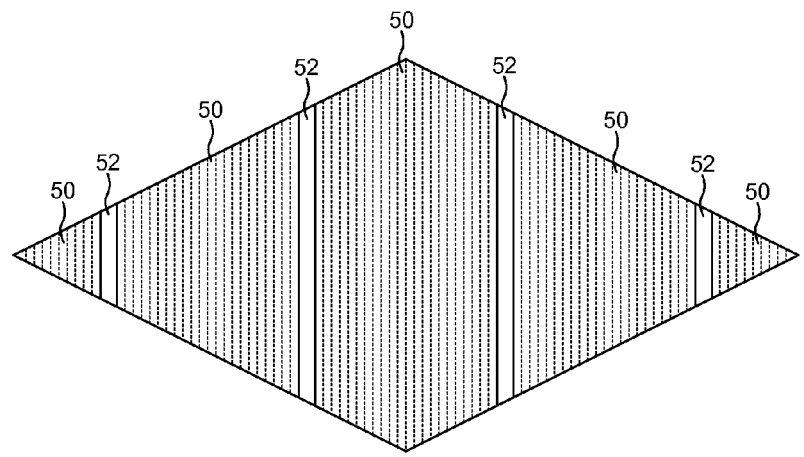
FIG. 4A shows a normal spiral track crossing read signal generated by reading one of the spiral tracks according to an embodiment of the present invention.

FIG. 4A shows an example spiral track crossing read signal that is generated as the head 20 passes over the spiral track 48 of FIG. 3 at a constant fly height (i.e., no FHM). The resulting read signal comprises a high frequency signal 50 interrupted periodically by a sync mark 52. The sync mark 52 may comprise any suitable pattern, such as a missing transition (missing bit), or a short pattern of bits. The control circuitry 42 comprises a suitable sync mark detector for detecting the occurrence of each sync mark. The detected sync marks 52 (and in one embodiment the high frequency transitions 50) are used to synchronize a servo clock used to servo write the disk. That is, the servo clock may be synchronized to the frequency and phase of the high frequency signal 50 generated by reading the spiral track 48. The servo clock is also used to open a servo demodulation window as the head approaches a spiral track so that the spiral track crossing can be demodulated to further synchronize the servo clock as well as generate a position error signal (PES) for servoing the head 20 over the disk 18 as is well known in the art.

Figure 1:
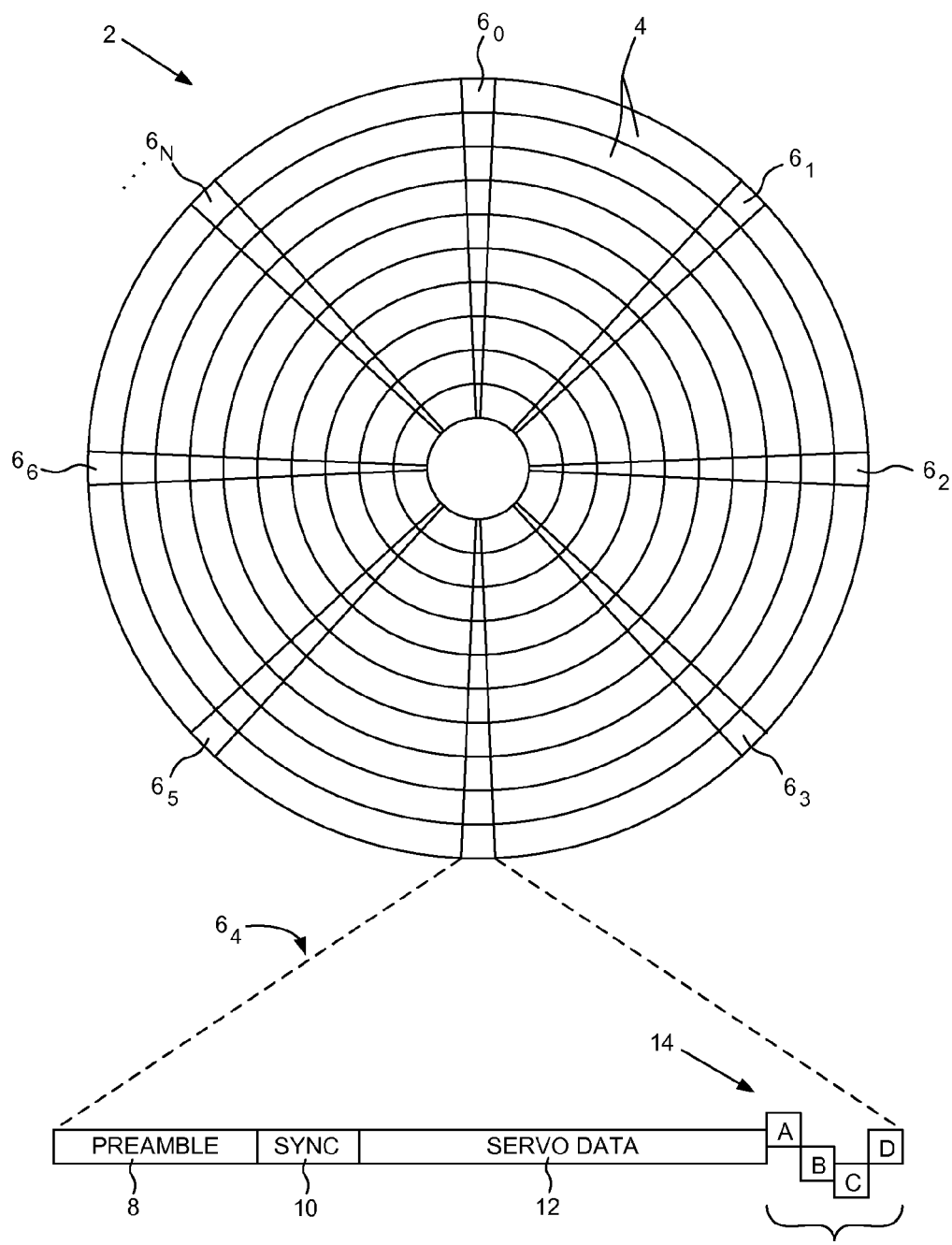
FIG. 1 shows a prior art disk format including concentric data tracks defined by a plurality of embedded servo sectors.
Figure 4B:
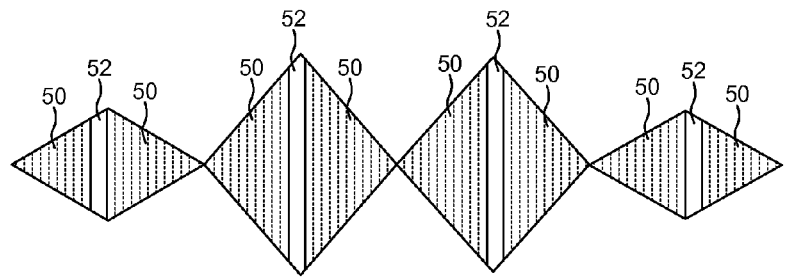
FIG. 4B shows a distorted spiral track crossing read signal due to fly height modulation.

FIG. 4B shows a distorted spiral track crossing read signal due to FHM. That is, as the head 18 passes over the spiral track the modulation in the fly height causes a distortion in the amplitude of the read signal. The inventors have discovered that the effect of FHM is related to the rotation speed of the disk 18 as well as characteristics of the gas (e.g., the density of the gas) inside the HDA 16. Therefore, in one embodiment the rotation speed is adjusted (e.g., increased) until the FHM falls below a threshold. The disk is then servo written (e.g., with concentric servo sectors 6 shown in FIG. 1) at the adjusted rotation speed.

Figure 5A:
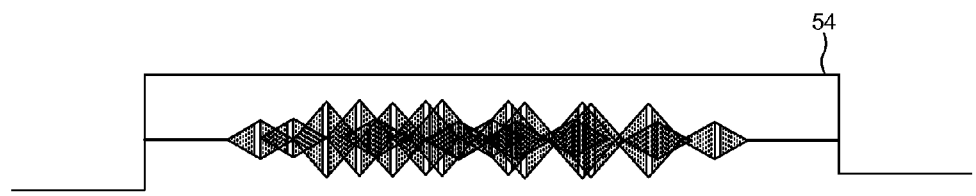
FIG. 5A shows a plurality of spiral track crossing read signals generated within a demodulation window and corresponding amplitude degradation and timing jitter due to fly height modulation.
Figure 5B:
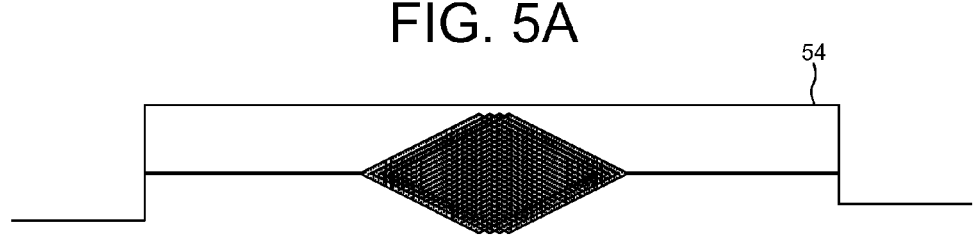
FIG. 5B shows improved spiral track crossing read signals within the demodulation window after increasing the rotation speed of the disk which causes a corresponding decrease in the fly height modulation.

FIG. 5A illustrates an embodiment of the present invention wherein prior to adjusting the rotation speed multiple distorted spiral track crossing read signals (FIG. 4B) may be detected in the demodulation window 54. As shown in FIG. 5A, the FHM may cause phase jitter in the servo clock that causes a phase shift of each spiral track crossing read signal within the demodulation window 54. In other words, the phase jitter in the servo clock causes the demodulation window to be opened too soon or too late relative to the spiral track crossing. The resulting amplitude of the spiral track crossing read signal is also reduced due to the FHM. Therefore, in one embodiment the phase shift and/or the amplitude of the spiral track crossing read signals is evaluated to determine the level of FHM. If the FHM exceeds a threshold, the rotation speed of the disk is adjusted (e.g., increased) until the FHM falls below the threshold. That is, the rotation speed of the disk is adjusted until the phase shift and/or amplitude of the spiral track crossing read signals fall within an acceptable range as illustrated in FIG. 5B.

Figure 6:
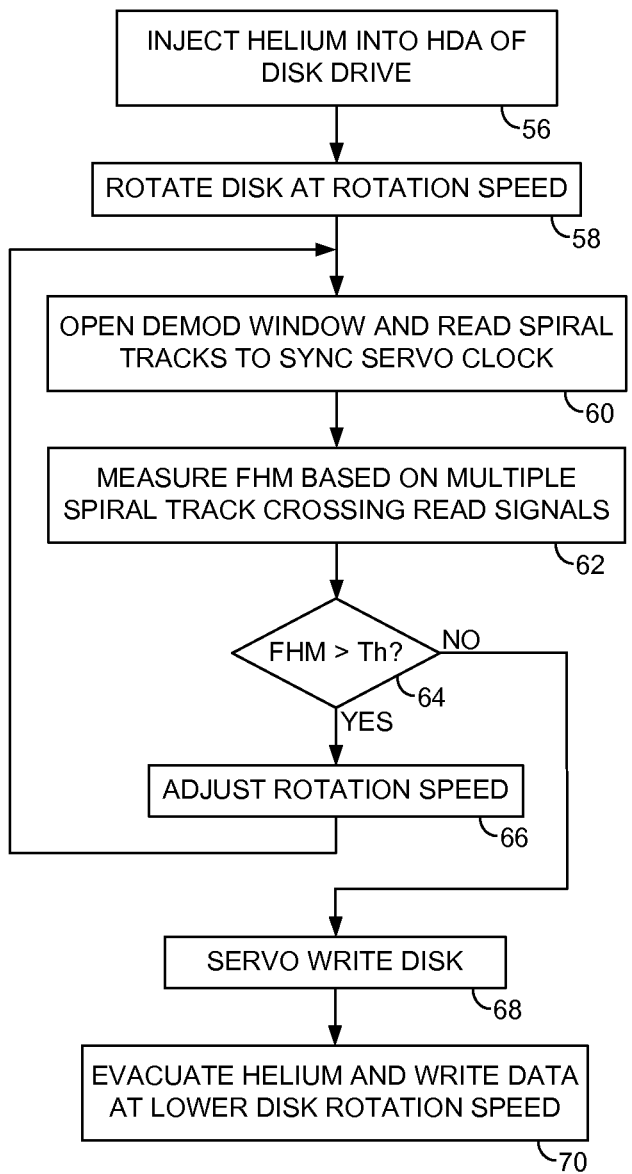
FIG. 6 is a flow diagram according to an embodiment of the present invention wherein multiple spiral track crossing read signals within a demodulation window are evaluated to determine whether the fly height modulation exceeds a threshold.

FIG. 6 is a flow diagram according to an embodiment of the present invention wherein helium is injected into the HDA 16 prior to servo writing the disk (step 56). The disk is rotated at an initial rotation speed (step 58) and the demodulation window opened in order to read spiral tracks and synchronize the servo clock (step 60). An FHM is measured based on multiple spiral track crossing read signals, for example, by measuring a phase shift relative to the demodulation window and/or by measuring the amplitude of the read signal (step 62). If the measured FHM is above a threshold (step 64), the rotation speed of the disk is adjusted (step 66) and the process repeated starting at step 60 until the FHM falls below the threshold (step 64). The disk is then servo written at the adjusted rotation speed (step 68). After servo writing the disk, the helium is evacuated from the HDA 16, and manufacturing data (e.g., test data) is written to the disk at a lower (normal) rotation speed for spinning in air (step 70).

In one embodiment, the rotation speed of the disk is initialized at step 58 of FIG. 6 to a low speed (e.g., the normal rotation speed for air), and then the rotation speed increased at step 66 until the FHM falls below the threshold. In an alternative embodiment, the rotation speed may be initialized to a high value and then decreased at step 66 until the FHM falls below the threshold.

In the embodiment described above with reference to FIGS. 5A and 5B, the data read from the disk comprises a spiral track 48 (FIG. 3). After finding the rotation speed that reduces FHM, the spiral tracks are processed to generate the timing and position information needed to servo write concentric servo sectors on the disk. In an alternative embodiment, the disk 18 may be initially written with a plurality of concentric servo sectors over a small band of seed servo tracks using an external servo writer or media writer. The concentric servo sectors in the seed servo tracks may then be read in order to calibrate the rotation speed for servo writing the disk. For example, the preamble 8 (FIG. 1) of a concentric servo sector may be evaluated (phase shift and/or amplitude) in order to measure the FHM. After finding the rotation speed that reduces FHM, the rest of the disk may be servo written using a suitable propagation technique wherein new servo sectors are written (propagated) across the disk surface starting with the seed servo sectors.

In one embodiment, the read signal generated from reading data from the disk (e.g., a spiral track) is evaluated by the control circuitry 42 using suitable algorithms. For example, the control circuitry 42 may measure a phase shift of the spiral track crossing read signal relative to the demodulation window 54, and/or the amplitude of the spiral track crossing read signal in order to measure the FHM. In an alternative embodiment, a design engineer may employ suitable instruments to evaluate the read signal visually (e.g., using an oscilloscope) and provide the feedback for adjusting the rotation speed of the disk. For example, a design engineer may adjust the rotation speed of the disk until the spiral track crossing read signals shown in FIG. 5A conform to the desired phase shift and amplitude as shown in FIG. 5B.

In the embodiment of FIG. 6, the HDA 16 is injected with a helium gas prior to servo writing the disk 18 which may improve the servo writing performance, for example, by reducing windage disturbance on the actuator arm 38 and/or by allowing a faster rotation speed to speed up the servo writing process. However, any suitable gas may be injected into the HDA 16, where the optimal rotation speed that minimizes FHM may vary depending on characteristics of the gas (e.g., density of the gas). Unlike windage disturbance, the disturbance due to FHM may increase if the disk is rotating too slow and may also manifest at rotation speeds lower than the speed at which windage disturbance becomes significant. It is therefore important to determine the optimal rotation speed of the disk that minimizes (or reduces) FHM so as to minimize the detrimental effect on the written servo sectors.

Ultimately the optimal rotation speed that minimizes FHM may be higher than the normal rotation speed when spinning in air, but significantly lower than other sources of disturbance, such as windage. Accordingly, the inventors have discovered a novel technique of calibrating the rotation speed of a disk prior to servo writing in gas by evaluating the level of FHM.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of selecting a rotation speed for servo writing a disk of a disk drive, the method comprising:
   injecting a gas into a head disk assembly (HDA) comprising the disk;
   rotating the disk at a rotation speed and reading data from the disk using a head to generate a read signal comprising a first frequency oscillation due to reading the data from the disk and a second frequency oscillation due to a fly height of the head varying as the disk rotates, wherein the first frequency is higher than the second frequency;
   measuring an amplitude of the second frequency oscillation to measure a fly height modulation (FHM) of the head;
   when the amplitude of the second frequency oscillation exceeds a threshold, adjusting the rotation speed;
   servo writing the disk at the adjusted rotation speed;
   after servo writing the disk and evacuating the gas from the HDA, rotating the disk at a normal rotation speed lower than the adjusted rotation speed used for servo writing the disk; and
   writing manufacturing data to the disk at the normal rotation speed.

2. The method as recited in claim 1, wherein the gas comprises helium.

3. The method as recited in claim 1, further comprising adjusting the rotation speed until the amplitude of the second frequency oscillation falls below the threshold.

4. The method as recited in claim 1, wherein the step of reading data from the disk comprises reading a spiral track recorded on the disk to generate a spiral track crossing read signal.

5. The method as recited in claim 4, wherein the step of measuring the amplitude of the second frequency oscillation comprises:
   generating at least two spiral track crossing read signals;
   synchronizing a servo clock in response to the spiral track crossing read signals;
   opening a demodulation window in response to the servo clock; and
   evaluating the spiral track crossing read signals to measure the amplitude of the second frequency oscillation.

6. The method as recited in claim 5, wherein the step of evaluating the spiral track crossing read signals comprises evaluating a phase shift of the spiral track crossing read signals relative to the demodulation window.

7. The method as recited in claim 5, wherein the step of evaluating the spiral track crossing read signals comprises evaluating an amplitude of the spiral track crossing read signals.

8. A disk drive comprising control circuitry and a head disk assembly (HDA) including a disk and a head actuated over the disk, wherein after injecting a gas into the HDA the control circuitry operable to:
   rotate the disk at a rotation speed and read data from the disk using the head to generate a read signal comprising a first frequency oscillation due to reading the data from the disk and a second frequency oscillation due to a fly height of the head varying as the disk rotates, wherein the first frequency is higher than the second frequency;
   measure an amplitude of the second frequency oscillation to measure a fly height modulation (FHM) of the head;
   when the amplitude of the second frequency oscillation exceeds a threshold, adjust the rotation speed;
   servo write the disk at the adjusted rotation speed;
   after servo writing the disk, rotate the disk at a normal rotation speed lower than the adjusted rotation speed used for servo writing the disk; and
   write manufacturing data to the disk at the normal rotation speed.

9. The disk drive as recited in claim 8, wherein the gas comprises helium.

10. The disk drive as recited in claim 8, wherein the control circuitry is further operable to adjust the rotation speed until the amplitude of the second frequency oscillation falls below the threshold.

11. The disk drive as recited in claim 8, wherein the control circuitry is further operable to measure the amplitude of the second frequency oscillation by reading a spiral track recorded on the disk to generate a spiral track crossing read signal.

12. The disk drive as recited in claim 11, wherein the control circuitry is further operable to:
   generate at least two spiral track crossing read signals;
   synchronize a servo clock in response to the spiral track crossing read signals;
   open a demodulation window in response to the servo clock; and
   evaluate the spiral track crossing read signals to measure the amplitude of the second frequency oscillation.

13. The disk drive as recited in claim 12, wherein the control circuitry is further operable to evaluate a phase shift of the spiral track crossing read signals relative to the demodulation window to measure the amplitude of the second frequency oscillation.

14. The disk drive as recited in claim 12, wherein the control circuitry is further operable to evaluate an amplitude of the spiral track crossing read signals to measure the amplitude of the second frequency oscillation.

* * * * *